UNITED STATES PATENT OFFICE.

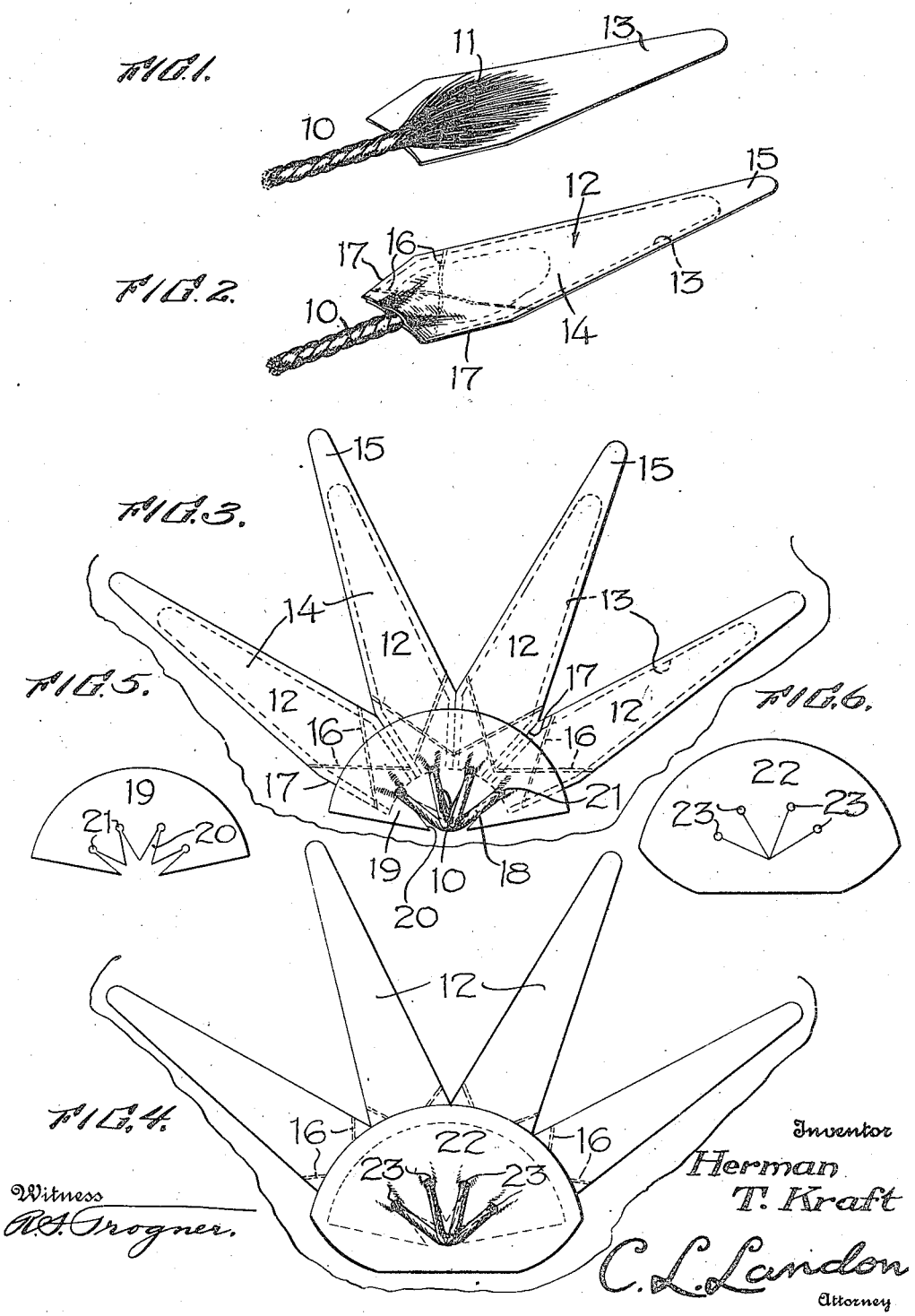

HERMAN T. KRAFT, OF AKRON, OHIO, ASSIGNOR TO THE GOODYEAR TIRE & RUBBER COMPANY, OF AKRON, OHIO, A CORPORATION OF OHIO.

SUSPENSION-PATCH FOR BALLOONS.

1,272,058.  Specification of Letters Patent.  Patented July 9, 1918.

Application filed September 11, 1916. Serial No. 119,512.

*To all whom it may concern:*

Be it known that I, HERMAN T. KRAFT, a citizen of the United States, residing at Akron, in the county of Summit and State of Ohio, have invented new and useful Improvements in Suspension-Patches for Balloons, of which the following is a specification.

My present invention relates to an improved form of anchor patch, and contemplates as its principal object the provision of means for securely attaching flexible elements to the body of a balloon envelop to provide points of support for weights which are to be suspended from the envelop.

It is an object of the invention to provide means for securing the ends of a flexible element firmly to the balloon in such manner that the strength of the attachment shall be greatly increased, and to group the separate ends of a pair of the elements in such fashion that the force acting upon the elements, due to the weight suspended therefrom, is evenly distributed over all portions of the surrounding envelop area.

It is a more detailed object of the invention to provide strain distributing fingers which radiate from the center of a suspension patch formed by a group of such fingers, each of the fingers securing one end of a flexible element providing a suspension loop upon the surface of a balloon envelop, and the entire group of fingers being reinforced by means which unify the suspension patch as a whole.

The above and additional objects of a similar nature, which will be hereinafter more specifically treated, may be accomplished by such means as are illustrated in the accompanying drawings, described in the following specification and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Figure 1 is a view in perspective showing the first step in attaching one end of a flexible element to a strain suspension finger-portion;

Fig. 2 is a similar view showing a completion of the finger, *per se*, as attached upon the end of the flexible element;

Fig. 3 is a face view of the suspension patch partially completed, showing the grouping of the individual fingers and a portion of the means correlating the separate fingers into a group;

Fig. 4 is a face view of the complete patch;

Fig. 5 is a face view of the under patch adapted to secure the grouped fingers of the suspension patch; and Fig. 6 is a face view of the cover patch used to complete the suspension fitting of this invention.

For the purpose of supporting the actual weight to be slung below the balloon envelop, I preferably employ cord, rope or cable loops, and usually place a pair of these loops at each suspension point. It is the purpose of this invention to disclose means whereby the rope loops may be firmly secured to the balloon envelop, and at the same time so supported thereupon that the weight dependent from the rope loops is distributed equally in a number of different directions over the surrounding area of the envelop.

In Fig. 1 there is illustrated a portion of a rope 10 which is subsequently to form one of the suspension loops. Each extremity of this rope 10 is raveled out in the manner denoted by the numeral 11 and the flattened mass of raveling is secured between upper and nether portions of the fabric finger, or tongue, which is denoted as a whole by the numeral 12. Each fabric finger is composed of a lower piece 13 and an upper piece 14 and it is to the lower piece 13 that the raveled rope end is first secured. Subsequently, the upper piece 14 is cemented and sewed upon the lower piece 13, which it overlaps in all directions. The extremity of the upper piece 14 terminates in an elongated tip 15 which projects some distance beyond the tapering tip of the under piece 13, and is adapted for an independent securement to the balloon envelop. Cross-sewing further secures the raveled end of the rope 10 between the tongue portions 13 and 14 in the manner indicated by the numeral 16.

The finished tongue is of the shape illustrated, in which the lower portion is cut upon lines 17 which will be radial to the center of suspension, i. e., the loop of the rope 10 when the latter is finally secured to the body of the balloon. When each end of the rope 10 has been provided with its fastening finger 12, a second rope 18 is similarly treated and the two ropes, with their central loops in substantial coincidence arranged in the manner shown in Figs. 3 and 4, the securing tongues 12 being grouped with respective edges 17 in contact, to provide the radially distributive strain patch shown in these figures.

The patch is, however, not complete until additional patch pieces have been provided to overlap the group of tongue pieces 12 in correlation thereof into a unitary suspension patch. An under patch 19 is shown in Fig. 5 being constructed of a substantially semi-circular piece of fabric which is provided with a number of radial slots 20 terminating in apertures 21 through which opposite ends of the ropes 10 and 18 may protrude. This under patch is cemented over the four tongue pieces and to the balloon body, and is subsequently sewed thereto. The cover patch 22 is separately illustrated in Fig. 6 and is of such size as to completely cover the under patch 19. Similarly to the latter, the cover patch is provided with a series of apertures 23 through which the rope ends extend, so that the coincident loops of the ropes 10 and 18 will remain upon the exterior of the completed patch.

The method of grouping the rope ends which I have illustrated is such that two central fingers support the ends of the rope 10 while the two extreme fingers anchor the rope 18. If desired I may, of course, resort to a method of grouping which provides for alternate fingers to anchor the extremities of the same rope, or the equivalent method which permits pairs of extreme fingers to support both ropes in a similar fashion.

In any event, I obtain a suspension point which is capable of sustaining a relatively heavy weight without setting up undue strains upon the supporting envelop of the balloon. The radial fingers 12 insure the proper distribution of the suspension strains over the area of the envelop adjacent the common suspension point, while the patch portions 19 and 22 correlate the fingers into a unitary group which removes any danger that the end fastenings for the paired suspension ropes may give way, since the repeated sewings and cementings insure the production of an enduring suspension patch and that, too, at relatively low cost and with the addition of but small weight to the whole balloon envelop.

What I claim is:

1. A suspension patch for balloons, including flexible elements, tongues adapted to anchor the extremities of the flexible elements to the balloon and patch pieces arranged to correlate the separate tongues into a unitary patch.

2. A suspension patch for balloons, including flexible elements provided with raveled extremities, a tongue to secure each extremity of a flexible element to a balloon, each tongue comprising upper and lower portions adapted to anchor the raveled extremities of the flexible element therebetween and patch pieces grouping separate tongues to form a unitary suspension patch.

3. A suspension patch for balloons including a flexible fabricated element having a raveled extremity and a tongue to secure the extremity to the balloon, the tongue comprising upper and lower portions adapted to receive between them the raveled extremity of the flexible element, said raveled extremity being secured against withdrawal from between the portions of the tongue.

4. A suspension patch for balloons including a flexible fabricated element having each extremity raveled, a tongue for each extremity whereby each of said extremities may be attached to the balloon, each of said tongues comprising a pair of mating pieces between which the raveled extremity of the flexible element is secured, said tongues being angularly related to each other when applied to the balloon.

5. In a suspension patch for balloons, a pair of flexible elements having bight loops arranged in substantial coincidence, composite finger pieces arranged to anchor each extremity of the pair of flexible elements, said fingers being grouped to radiate over the surrounding area of the balloon body from the coinciding loops as a center, an under patch securing all of said tongues in a unitary group, and a cover patch supplementing the effect of said under patch, the loops of said suspension elements projecting through both the under patch and the cover patch.

In testimony whereof, I have signed my name in the presence of a subscribing witness.

HERMAN T. KRAFT.

Witness:
H. J. GINTHER.